J. PARRINO.
VEHICLE TIRE.
APPLICATION FILED SEPT. 2, 1919.
1,331,358.  Patented Feb. 17, 1920.
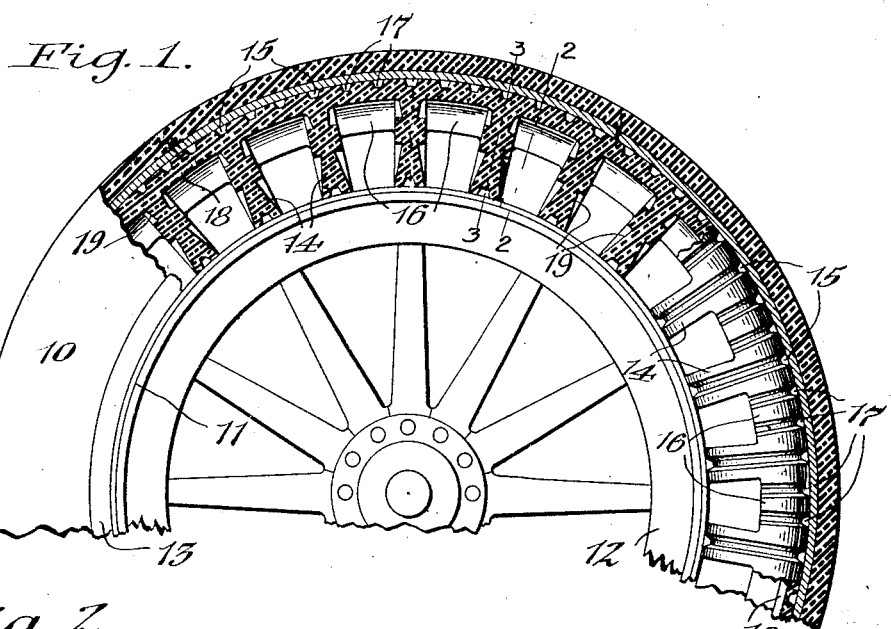
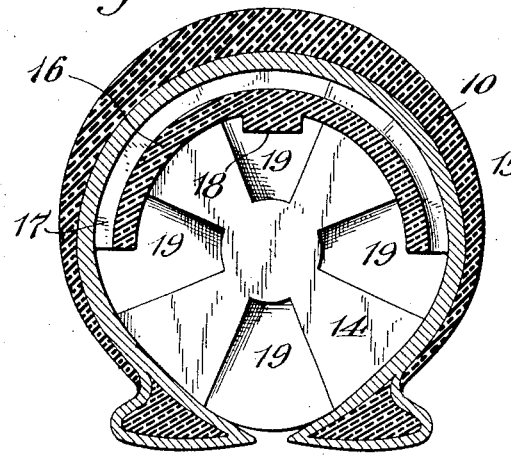
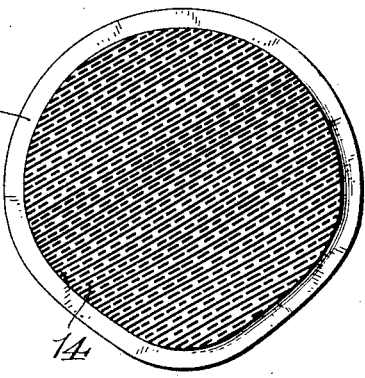
Inventor,
Joseph Parrino,
by Geyer Popp
Attorneys.

UNITED STATES PATENT OFFICE.

JOSEPH PARRINO, OF BUFFALO, NEW YORK, ASSIGNOR OF ONE-HALF TO GUISEPPE DI GIROLAMO, OF BUFFALO, NEW YORK.

VEHICLE-TIRE.

1,331,358.  Specification of Letters Patent.  Patented Feb. 17, 1920.

Application filed September 2, 1919. Serial No. 321,031.

*To all whom it may concern:*

Be it known that I, JOSEPH PARRINO, a citizen of the United States, residing at Buffalo, in the county of Erie and State of New York, have invented new and useful Improvements in Vehicle-Tires, of which the following is a specification.

This invention relates to a vehicle tire and more particularly to a cushion or resilient tire adapted for use on automobiles, trucks and the like.

One of the objects of my invention is to produce a tire of this character which utilizes an inner structure or core constructed of resilient material, to take the place of the customary inflated air tube now commonly used within the tire-shoe.

Another object of this invention is to produce a tire which will withstand the load placed upon it and at the same time have the necessary resilient qualities for absorbing and neutralizing shocks due to uneven road surfaces.

Further objects are to produce a resilient tire of this character which, while affording the advantage of resiliency, is not affected by punctures or other injuries common to pneumatic tires now in use, and which permits circulation of the air in the tire to keep the same cool and prolong its life.

In the accompanying drawings:

Figure 1 is a fragmentary side view, partly in section, of a vehicle wheel provided with my improved tire. Fig. 2 is a cross section on line 2—2, Fig. 1. Fig. 3 is a cross section on line 3—3, Fig. 1.

Similar characters of reference indicate corresponding parts in the several views.

10 indicates the shoe or outer casing of the tire which may be constructed of rubber and fabric, as usual, and as shown is preferably of the clencher type, although it may be of any other well known construction. The casing is retained on the rim 11 of the wheel 12 by means of the customary clencher ring 13.

The inner structure or core comprising the cushioning or resilient means arranged within the casing 10 of the tire is preferably constructed as follows:

14 represents a plurality of cushioning blocks or partitions, constructed of rubber or other similar material possessing elastic and resilient qualities. These blocks are shaped to conform to the configuration of the interior of the tire casing so as to fit snugly therein, as shown in Figs. 2 and 3, and are arranged radially thereof and equally spaced circumferentially of the same, as shown in Fig. 1. The thickness of the cushioning blocks is such that they are capable of sustaining the tire under given loads, and at the same time affording the necessary resilience to absorb and neutralize the shocks of the vehicle due to road conditions. Each of these blocks is preferably provided in its periphery with one or more annular grooves 15 forming spaces between the tire casing and the blocks which permit of the circulation of air, thereby assisting in keeping the tire cool and retarding the deterioration of the same.

Connecting the several cushioning blocks at their outer edges and arranged circumferentially of the tire are spacing webs 16, preferably of arcuate or semi-circular form, as shown in Fig. 2, which terminate about midway of the diameter of the tire casing and conform to the configuration of the interior of the same. These webs are also provided in their periphery with one or more grooves 17 which are arranged concentrically with the blocks and which permit circulation of air between the tire casing and the webs and the spaces between the blocks and also lighten the same. These webs are preferably constructed integrally with the cushioning blocks 14. A rib 18 may be arranged on the underside of each of the webs 16 which connects the adjacent blocks 14 for the purpose of reinforcing the webs. The webs together with the strengthening ribs 18 prevent displacement of the cushioning blocks circumferentially of the tire and retain them in a radial position and at right angles to the load and shock imposed upon them.

If desired, the cushioning blocks 14 may be provided with radially arranged recesses 19 in their opposite sides, which, as shown in Figs. 1 and 2, are deepest at their inner ends and gradually decrease in depth toward their outer ends, thereby producing greater resilience together with a lighter construction and less material.

The several elements comprising the core of the cushioning means, namely, the cushioning blocks 14, connecting webs 16 and ribs 18, can be molded in one piece, thereby simplifying the construction of the core and reducing its cost of manufacture.

The cushioning blocks 14 are placed at comparatively close intervals so as to give sufficient support to the tread portion of the tire and are of the necessary resilience to absorb shocks due to inequalities of the road. The webs 16, while serving to tie the cushioning blocks together in forming a continuous core structure, also assist them in supporting the tire and neutralizing shocks.

This improved cushioning device is as readily applicable to the tire casings or shoes now in use as the customary inner tubes. The insertion and removal of the cushioning core is accomplished in the same manner as the inner tube.

I claim as my invention:

1. A core for cushioned vehicle tires comprising a plurality of separated resilient blocks and spacing webs connecting the blocks, said blocks being provided in their convex faces with annular ventilating grooves.

2. A core for cushioned vehicle tires comprising a plurality of separated resilient blocks arranged radially about an axis, and spacing webs connecting said blocks, said blocks and webs being provided in their convex faces with ventilating grooves extending transversely of the core.

JOSEPH PARRINO.